(12) United States Patent
Haas et al.

(10) Patent No.: US 8,358,452 B2
(45) Date of Patent: Jan. 22, 2013

(54) IMAGING SYSTEM AND METHOD

(75) Inventors: William Robert Haas, Fort Collins, CO (US); Kirk Steven Tecu, Greeley, CO (US); Louis R. Turf, III, Loveland, CO (US)

(73) Assignee: Hewlett-Packard Development Company, Houston, TX (US)

( * ) Notice: Subject to any disclaimer, the term of this patent is extended or adjusted under 35 U.S.C. 154(b) by 1708 days.

(21) Appl. No.: 11/139,353

(22) Filed: May 27, 2005

(65) Prior Publication Data
US 2006/0268377 A1    Nov. 30, 2006

(51) Int. Cl.
*H04N 1/46* (2006.01)
*H04N 1/04* (2006.01)
*G06K 9/40* (2006.01)

(52) U.S. Cl. ........ 358/504; 358/474; 358/493; 358/505; 382/274; 382/275

(58) Field of Classification Search ................. 358/504, 358/493
See application file for complete search history.

(56) References Cited

U.S. PATENT DOCUMENTS

| | | | |
|---|---|---|---|
| 4,335,173 A | 6/1982 | Caraballo | |
| 5,065,257 A | 11/1991 | Yamada | |
| 5,204,761 A * | 4/1993 | Gusmano | 358/461 |
| 5,214,470 A | 5/1993 | Denber | |
| 5,436,979 A | 7/1995 | Gray et al. | |
| 5,815,607 A | 9/1998 | Miura | |
| 6,035,072 A | 3/2000 | Read | |
| 6,317,223 B1 | 11/2001 | Rudak et al. | |
| 6,393,161 B1 | 5/2002 | Stevenson et al. | |
| 6,522,431 B1 | 2/2003 | Pitts et al. | |
| 6,552,829 B1 * | 4/2003 | Maciey et al. | 358/509 |
| 6,600,579 B1 | 7/2003 | Kumagai et al. | |
| 6,618,173 B1 * | 9/2003 | Nobel et al. | 358/513 |
| 2002/0171819 A1 * | 11/2002 | Cheung | 355/133 |
| 2004/0119397 A1 * | 6/2004 | Sakamoto | 313/495 |
| 2004/0207886 A1 * | 10/2004 | Spears | 358/474 |
| 2006/0063274 A1 * | 3/2006 | Schremp et al. | 436/180 |

* cited by examiner

*Primary Examiner* — Fan Zhang

(57) ABSTRACT

An imaging system comprises a calibration system adapted to perform a calibration scan of a charged luminescent calibration strip disposed in a scan window of an automatic document feeder. The calibration system is adapted to determine whether an opaque object is disposed within a visible area defined by the scan window from the calibration scan.

30 Claims, 3 Drawing Sheets

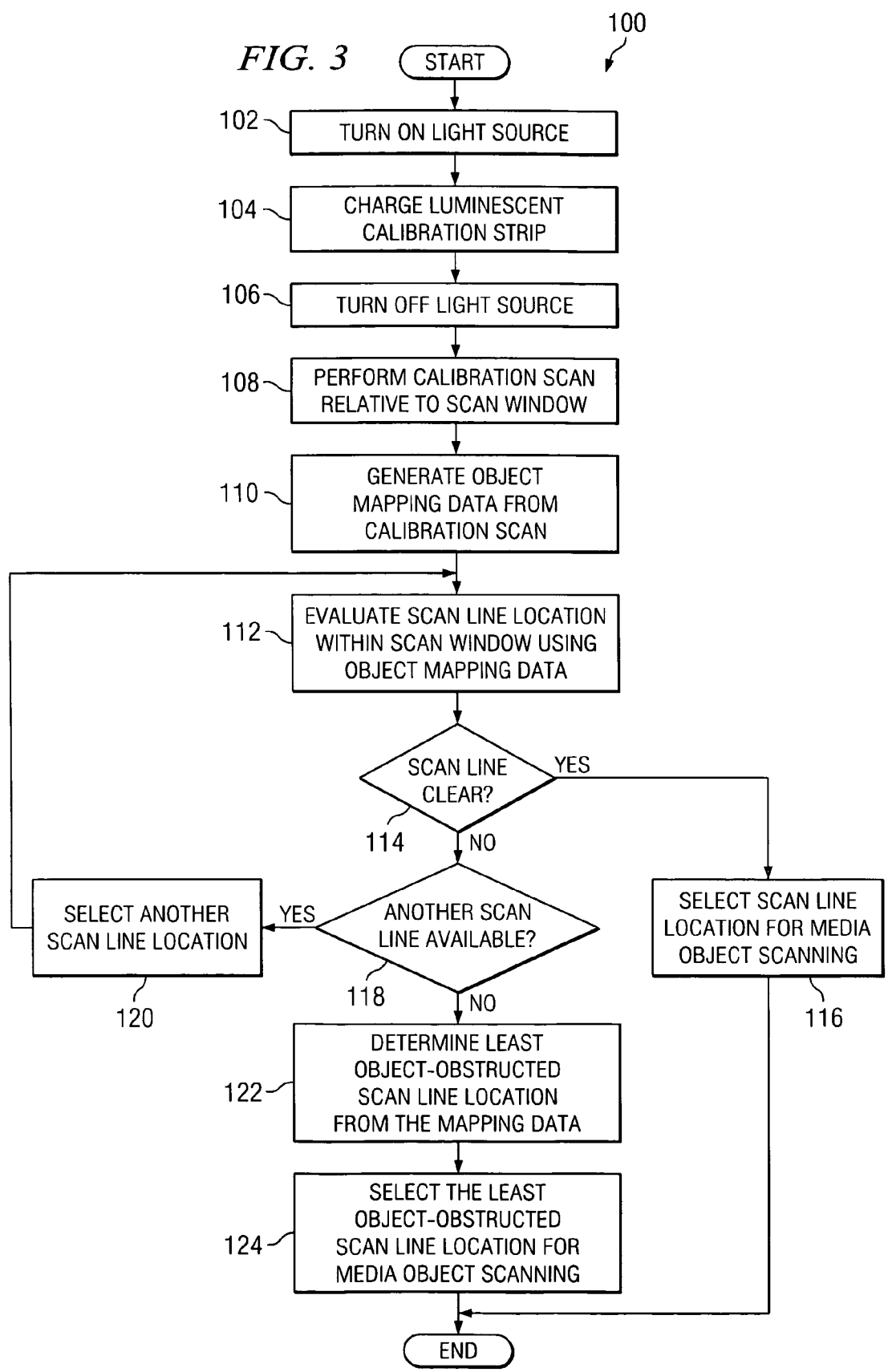

IMAGING SYSTEM AND METHOD

BACKGROUND OF THE INVENTION

Automatic document feeders are used to automatically feed sheets of paper and/or other types of media objects to a scanning area of an imaging device such as a scanner, copier, or facsimile machine. For example, some types of automatic document feeders have a scan window through which the media object is "viewed" by the imaging device to generate a scanned image of the media object. However, if an opaque object such as dirt, dust, or another type of undesired object is disposed within a viewing area as defined by the scan window, the resulting scanned image of the media object generally contains a streak corresponding to a location of the opaque object as the media is moved across the opaque object during a scan.

BRIEF DESCRIPTION OF THE DRAWINGS

For a more complete understanding of the present invention and the advantages thereof, reference is now made to the following descriptions taken in connection with the accompanying drawings in which:

FIG. 3 is a flow diagram illustrating an embodiment of an imaging method in accordance with the present invention.

DETAILED DESCRIPTION OF THE DRAWINGS

Figure 1:
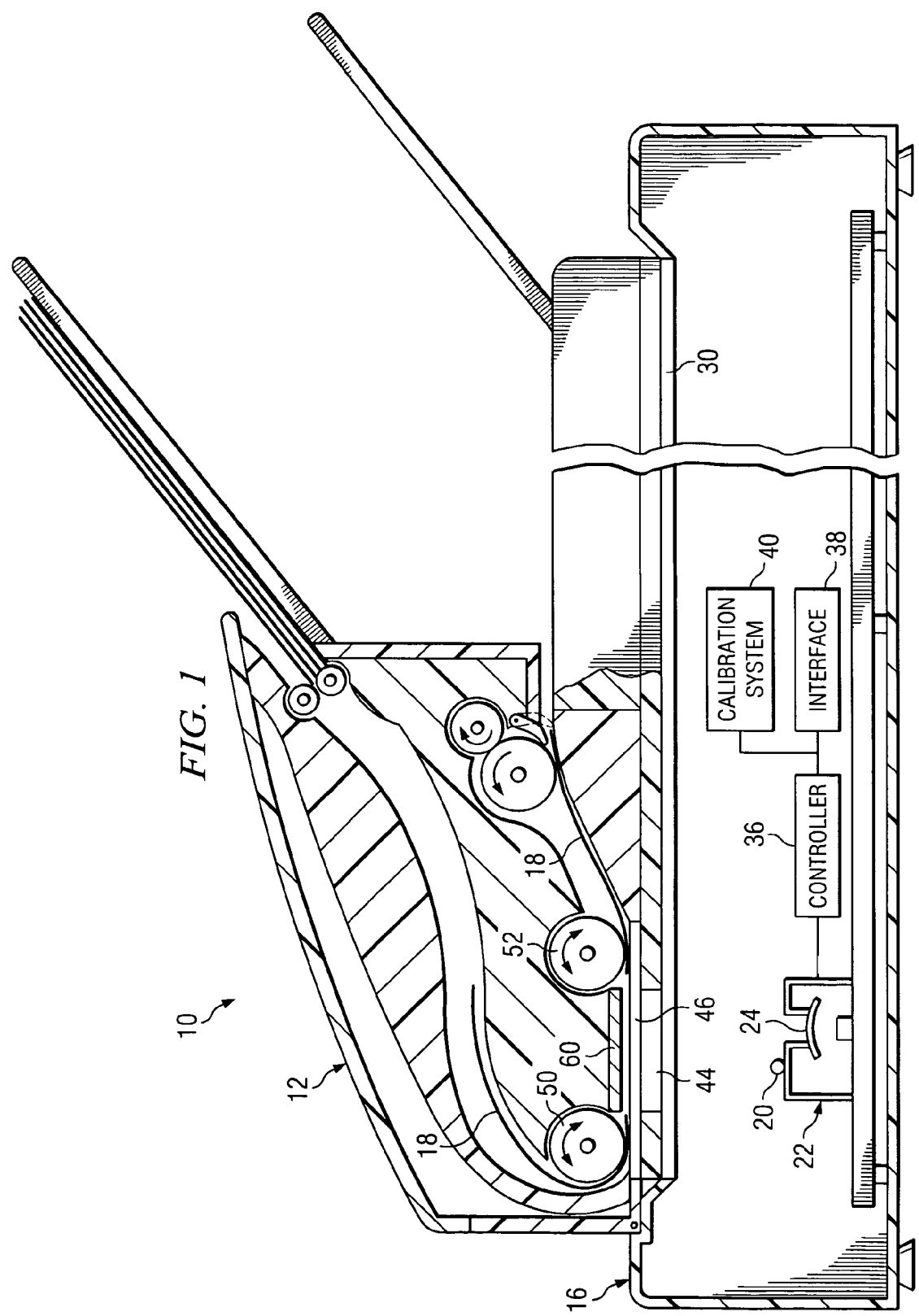
FIG. 1 is a diagram illustrating an embodiment of an imaging system in accordance with the present invention.
Figure 2:
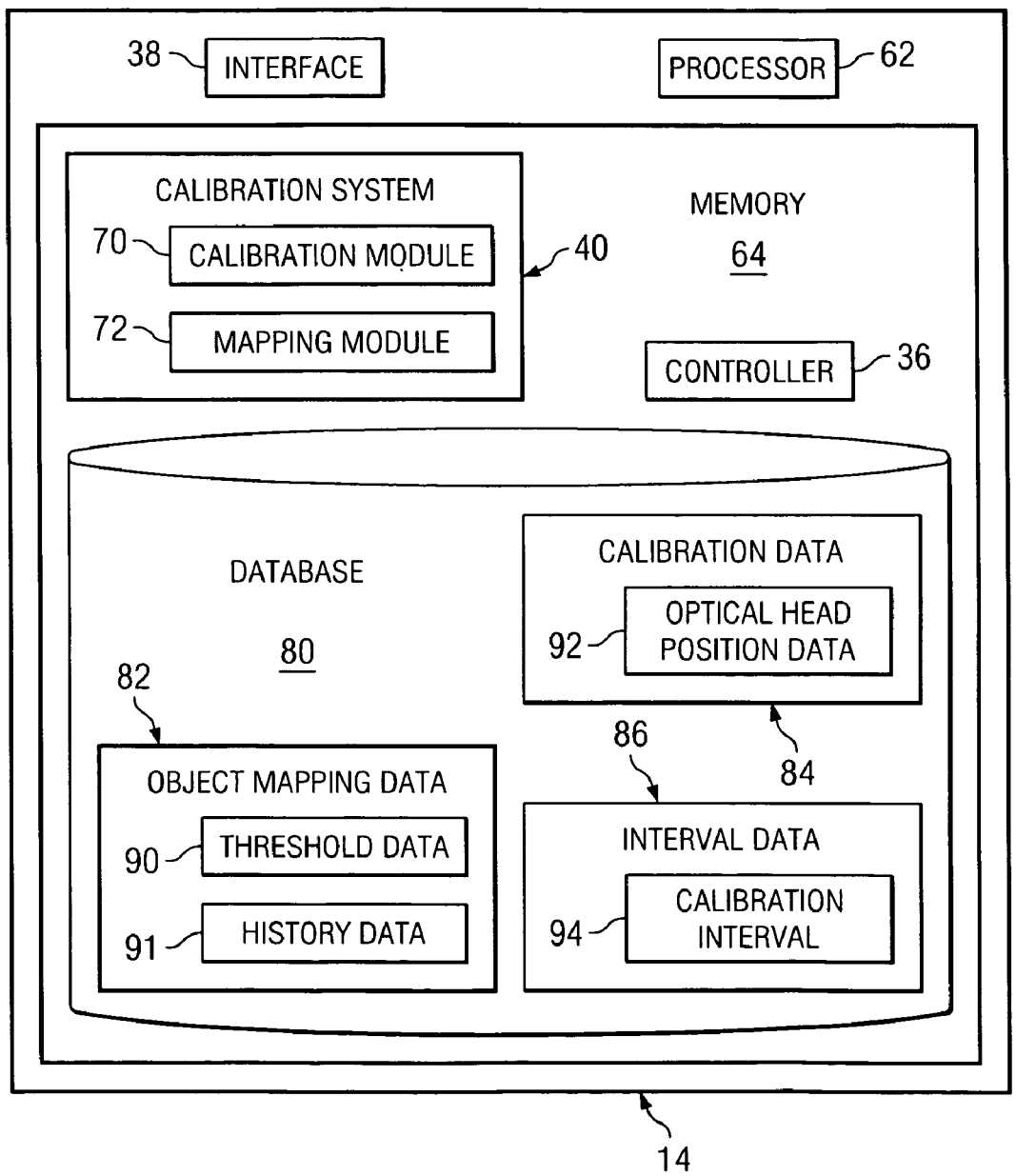
FIG. 2 is a block diagram illustrating an embodiment of the imaging system illustrated in FIG. 1 in accordance with the present invention.

The preferred embodiments of the present invention and the advantages thereof are best understood by referring to FIGS. 1-3 of the drawings, like numerals being used for like and corresponding parts of the various drawings.

FIG. 1 is a diagram illustrating an embodiment of an imaging system 10 in accordance with the present invention. In the embodiment illustrated in FIG. 1, imaging system 10 comprises an automatic document feeder (ADF) 12 and an imaging device 14. Imaging device 14 comprises any type of device for scanning and generating an image of a media object 18 such as, but not limited to, a scanner, copier, or facsimile machine. ADF 12 comprises any type of feeding mechanism for automatically feeding or placing media object(s) 18 within view of imaging device 14 to facilitate scanning of media object(s) 18 such as, but not limited to, a scroll-feed or a platen-feed mechanism.

In the embodiment illustrated in FIG. 1, imaging device 14 comprises a light source 20 for illuminating media object 18 and an optical head 22 for receiving an optical signal reflected by media object 18. For example, in the embodiment illustrated in FIG. 1, optical head 22 comprises an image sensor array 24 for converting optical signals received or otherwise reflected from media object 18 to electronic signals such as, but not limited to, a charge coupled device (CCD) array. Imaging device 14 also comprises a platen 30 for supporting media object(s) 18 during a scanning operation.

In the embodiment illustrated in FIG. 1, imaging device 14 also comprises a controller 36, an interface 38, and a calibration system 40. Controller 36, interface 38, and calibration system 40 may comprise hardware, software, or a combination of hardware and software. In operation, controller 36 is used to control a scanning operation using imaging device 14 such as, but not limited to, locating and/or otherwise positioning or moving optical head 22 relative to platen 30 and/or activating and deactivating light source 20. Interface 38 is used to provide a user of system 10 with an interface for communicating with system 10, for inputting information to system 10 or receiving an output of information from system 10. For example, interface 38 may comprise a keypad, touch pad, liquid crystal display (LCD), or other type of mechanism for enabling information transfer between system 10 and a user of system 10. Calibration system 40 is used for performing a calibration scan of system 10.

In the embodiment illustrated in FIG. 1, ADF 12 comprises a scan window 44 through which media object(s) 18 to be scanned can be imaged by imaging device 14. In the embodiment illustrated in FIG. 1, scan window 44 is sized having a generally small cross-sectional area relative to a cross-sectional area of platen 30. However, it should be understood that scan window 44 may be otherwise sized (e.g., scan window 44 may be sized having a cross-sectional area smaller than, greater than, or equal to a cross-sectional area of platen 30). In the embodiment illustrated in FIG. 1, ADF 12 also comprises a feed strip 46 constructed from mylar, plastic or another suitable transparent material and disposed over scan window 44 between media object 18 and platen 30 to enable recovery and/or rejection of media object(s) 18 from ADF 12. ADF 12 also comprises rollers 50 and 52 for feeding media object(s) 18 past scan window 44 to facilitate image scanning of media object(s) 18 by imaging device 14.

In the embodiment illustrated in FIG. 1, ADF 12 further comprises a luminescent calibration strip 60 disposed at least partially within an area as defined by scan window 44 such that calibration strip 60 is visible by optical head 22 through feed strip 46, scan window 44 and platen 30 (e.g., calibration strip 60 may be sized having a cross-sectional area greater than, less than, or equal to a cross-sectional area of scan window 44). In the embodiment illustrated in FIG. 1, calibration strip 60 is disposed within ADF 12 such that feed strip 46 is disposed between calibration strip 60 and platen 30 of imaging device 14. In some embodiments of the present invention, calibration strip 60 is formed by coating or otherwise applying a luminescent material or coating to a substrate material such as, but not limited to, plastic or mylar. In other embodiments of the present invention, a luminescent material is impregnated into a substrate material. Thus, it should be understood that a variety of different types or methods may be used to form calibration strip 60. In operation, calibration strip 60 is used to determine whether an opaque object(s) or material(s) such as, but not limited to, dust, dirt, fingerprint, smudge, or any other type foreign or undesirable matter is disposed on or within feed strip 46 which may otherwise cause a streak to appear on an output of a scanned image of media object(s) 18.

In operation, according to some embodiments of the present invention, calibration system 40 causes or otherwise communicates with controller 36 to activate light source 20 to illuminate and/or otherwise charge calibration strip 60. After a predetermined time period (e.g., a time period adequate to suitably charge calibration strip 60 for obtaining a desired level of illumination by calibration strip 60), calibration system 40 causes and/or otherwise communicates with controller 36 to turn off light source 20. Calibration system 40 also causes and/or otherwise communicates with controller 36 to move optical head 22 relative to scan window 44 to perform a calibration scan of at least a portion of scan window 44 using light emitted by the charged calibration strip 60 through feed strip 46, scan window 44 and platen 30 to optical head 22. The image information captured by optical head 22 during the calibration scan is used to identify and/or otherwise locate opaque objects or materials within a visible or viewable area defined by the scan window 44 (e.g., such as opaque objects or materials on or within feed strip 46). In the embodiment of the present invention described above, light source 20 of imaging device 14 is used to charge calibration strip 60. However, it should be understood that calibration strip 60 may be otherwise charged (e.g., a light source located within ADF 12 or elsewhere).

FIG. 2 is a block diagram illustrating an embodiment of system 10 in accordance with the present invention. In the embodiment illustrated in FIG. 2, imaging device 14 comprises a processor 62 and a memory 64. In the embodiment illustrated in FIG. 2, controller 36 and calibration system 40 are illustrated as being stored in memory 64 so as to be accessible and/or executable by processor 62. However, it should be understood that controller 36 and/or calibration system 40 may be otherwise stored, even remotely from imaging device 14. In the embodiment illustrated in FIG. 2, calibration system 40 comprises a calibration module 70 and a mapping module 72 each of which may comprise hardware, software, or a combination of hardware and software. Calibration module 70 is used to perform and/or otherwise control a calibration scan of calibration strip 60. Mapping module 72 is used to map and/or otherwise analyze image information obtained during the calibration scan based on light received from a charged calibration strip 60 to locate and/or otherwise identify opaque object(s) or material(s) within a visible or viewable area defined by scan window 44 by optical head 22 (e.g., on or within feed strip 46).

In the embodiment illustrated in FIG. 2, memory 64 comprises a database 80 having object mapping data 82, calibration data 84, and interval data 86. Object mapping data 82 comprises information associated with mapping of locations of opaque objects within a visible or viewable area as defined by scan window 44 by optical head 22. For example, in operation, opaque objects visible by optical head 22 in the area defined by scan window 44 generally result in black or dark spots in the imaging content resulting from the calibration scan of calibration strip 60 which are mapped relative to a cross-sectional area of at least a portion of scan window 44. In the embodiment illustrated in FIG. 2, object mapping data 82 comprises threshold data 90 and history data 91. Threshold data 90 comprises information associated with a threshold value used to evaluate calibration scan image information (e.g., dark or black spots) indicating an opaque(s) object within the visible area defined by scan window 44. For example, in some embodiments of the present invention, image information indicating the presence of an opaque object(s) within the visible area defined by scan window 44 falling below a predetermined threshold value as indicated by threshold data 90 (e.g., a relatively small object as indicated by a relatively small black or dark spot) are considered to be insignificant and/or otherwise inconsequential to the quality of a scanned image of media object(s) 18. In some embodiments of the present invention, threshold data 90 is also used to evaluate calibration scan information on a scan line-by-scan line basis. For example, in some embodiments of the present invention, threshold data 90 comprises information associated with a threshold value for determining a quantity or level of obstruction from opaque objects within the visible or viewable area defined by scan window 44 for a particular scan line of imaging device 14 to determine whether the particular scan line produces a desired level of quality for scanning media object(s) 18. For example, in some embodiments of the present invention, particular scan lines of optical head 22 relative to scan window 44 that meet or exceed a particular threshold value as indicated by threshold data 90 are considered to be relatively free or minimally obstructed by opaque objects visible through scan window 44, thereby indicating an acceptable scan line location for optical head 22 relative to scan window 44 for scanning media object(s) 18. In some embodiments of the present invention, mapping data 82 is used to determine a percent of visible area defined by scan window 44 that is occluded by opaque object(s) and/or material(s). For example, in some embodiments of the present invention, mapping data 82 is used to determine whether a percent of visible area defined by scan window 44 that is occluded by opaque object(s) and/or material(s) is acceptable or unacceptable for generating a scanned image. Thus, embodiments of the present invention enable positioning of optical head 22 for a scanning procedure to take advantage of identified acceptable scan line locations. However, it should be understood that threshold data 90 may be otherwise used or formulated for analyzing image information acquired via the calibration scan. Further, in some embodiment of the present invention, a user of system 10 is notified (e.g., via a display or otherwise) of a percent of visible area defined by scan window 44 that is occluded by opaque object(s) and/or material(s), thereby enabling a user of system to evaluate whether to generate a scanned image given the current percent of visible area defined by scan window 44 that is occluded by opaque object(s) and/or material(s).

History data 91 comprises historical and/or time-based information associated with calibration scan image content. For example, in some embodiments of the present invention, historical data 91 comprises information associated with mapping content resulting from calibration scans of calibration strip 60 as a function of time to determine whether changes to the quantity or severity of opaque objects visible by optical head 22 through scan window 44 has increased. Thus, in operation, history data 91 is used to compare object mapping data 82 over time. In some embodiments of the present invention, if the quantity or severity of opaque objects visible by optical head through scan window 44 has increased beyond a predetermined threshold, as indicated and/or otherwise defined by threshold data 90, calibration system 40 is configured to alert and/or otherwise notify a user of system 10 (e.g., via interface 38) of such a condition, thereby indicating to the user that scan window 44 and/or feed strip 46 requires cleaning and/or replacement.

In the embodiment illustrated in FIG. 2, calibration data 84 comprises optical head position data 92 having information associated with least-obstructed scan line location(s) relative to scan window 44 based on the calibration scan of calibration strip 60. For example, in operation, based on mapping data 82 acquired using the calibration scan, calibration module 70 evaluates a level of obstruction by opaque objects visible by optical head 22 through scan window 44 for one or more scan lines of optical head 22 relative to scan window 44. Thus, in operation, calibration module 70 identifies or otherwise locates a least-obstructed scan line relative to scan window 44 for locating optical head 22 for performing a scan operation of a media object 18 based on object mapping data 82. The particular scan line or location of optical head 22 relative to scan window 44 for performing a scanning operation of a media object 18 is stored as optical head position data 92 such that upon initiating a scan of a media object 18, calibration module 70 communicates or otherwise interfaces with controller 36 to position or locate optical head 22 relative to scan window 44 having a least-obstructed view of media object(s) 18 based on object mapping data 82.

In the embodiment illustrated in FIG. 2, interval data 86 comprises information associated with an interval for performing a calibration scan of scan window 44 using calibration strip 60. For example, in the embodiment illustrated in FIG. 2, interval data 86 comprises a calibration interval 94 indicating or otherwise designating a predetermined interval for performing a calibration scan using calibration strip 60 to evaluate scan window 44. In some embodiments of the present invention, calibration interval 94 comprises information associated with a predetermined time period (e.g., every thirty minutes), quantity of scans (e.g., fifty scanning passes of optical head 22) and/or quantity of media object 18 feeds (e.g., fifty media object 18 feeds) such that a calibration scan is performed using calibration strip 60 at such predetermined interval. In other embodiments of the present invention, calibration interval 94 indicates or otherwise designates that a calibration scan is performed before each scan of a media object 18 (e.g., before a scan of a single or multiple media object(s) 18, upon each reboot of imaging system 10 and/or after being idle for a predetermined period of time). However, it should understood that the interval of performing a calibration scan may be otherwise determined. Additionally, in some embodiments of the present invention, a user may request the performance of a calibration scan via interface 38.

Thus, in operation, calibration system 40 interfaces and/or otherwise communicates with controller 36 to perform a calibration scan by turning on light source 20 to illuminate and/or otherwise charge luminescent calibration strip 60. When calibration strip 60 is sufficiently charged, calibration system 40 interfaces and/or otherwise communicates with controller 36 to turn off light source 20 and performs a calibration scan of at least a portion of scan window 44 using optical head 22. In operation, using light emitted by calibration strip 60 and received by optical head 22 during the calibration scan, calibration system 40 generates object mapping data 82 (e.g., via mapping module 72) indicating the locations of opaque objects visible by optical head 22 through scan window 44 (e.g., opaque objects on or within feed strip 46).

Using the calibration scan, calibration module 70 evaluates object mapping data 82 to determine and/or otherwise identify scan lines for optical head 22 relative to scan window 44 for obtaining an optimum view of a media object 18 through scan window 44 (e.g., a least-obstructed view of a media object 18). As described above, in some embodiments of the present invention, calibration module 70 accesses and/or otherwise uses threshold data 90 to evaluate particular locations and/or scan lines of scan window 44 to determine and/or otherwise identify particular scan lines for optical head 22 for performing a scan operation of a media object 18. Additionally, in some embodiments of the present invention, threshold data 90 also comprises information associated with object mapping over a predetermined time interval as indicated by history data 91 to determine whether an increase in obstruction to scan window 44 is occurring over the predetermined time interval. Thus, in operation, if calibration module 70 determines that, over a predetermined time interval, the level of obstruction of scan window 44 is increasing based on a series or set of different calibration scans, calibration system 40 alerts and/or otherwise notifies a user of system 10 of such condition, thereby notifying and/or otherwise enabling a user to clean or perform another action on system 10 (e.g., clean platen 30, clean feed strip 46 and/or replace feed strip 46).

FIG. 3 is a flow diagram illustrating an embodiment of an imaging method in accordance with the present invention. The method begins at block 102, where a calibration scan is initiated and light source 20 is turned on. At block 104, light source 20 is used to charge luminescent calibration strip 60. At block 106, after a predetermined time interval, light source 20 is turned off. At block 108, calibration system 40 performs a calibration scan relative to at least a portion of scan window 44 using light emitted through scan window 44 by calibration strip 60 and received by optical head 22.

At block 110, calibration system 40 generates object mapping data 82 based on light received by optical head 22 from calibration strip 60 during the calibration scan. At block 112, calibration system 40 evaluates scan line locations of optical head 22 relative to scan window 44 using object mapping data 82. At decisional block 114, a determination is made whether the particular scan line is clear or otherwise exceeds a predetermined threshold, as indicated by a threshold data 90, thereby indicating a desired and/or least-obstructed view of media object 18 during a scan operation. If the particular scan line is clear and/or otherwise exceeds a predetermined threshold, the method proceeds to block 116, where the particular scan line is selected as a location for locating optical head 22 for performing a scan of a media object 18. If, at decisional block 114, a determination is made that the particular scan line is not clear or otherwise does not exceed a predetermined threshold indicating an acceptable or desired view of a media object 18 via scan window 44, the method proceeds to decisional block 118, where a determination is made whether another scan line for optical head 22 relative to scan window 44 is available. If another scan line for optical head 22 relative to scan window 44 is available, the method proceeds to block 120, where the next or another scan line for optical head 22 is selected and analyzed using object mapping data 82. If another scan line for optical head 22 relative to scan window 44 is not available, the method proceeds to block 122, where calibration system 40 determines or otherwise locates a least object-obstructed scan line location using object mapping data 82 for locating optical head 22 for performing a scan of media object 18. For example, in some embodiments of the present invention, calibration system 40 may be used to analyze each scan line for optical head 22 relative to scan window 44 before locating and/or otherwise identifying a particular scan line for locating optical head 22 for performing a scan of a media object 18 (e.g., using a best-fit type of analysis or other type of comparative analysis method). In other embodiments of the present invention, it may occur that each scan line for optical head 22 relative to scan window 44 falls below a particular threshold value as indicated by threshold data 90, such that calibration system 40 identifies and/or otherwise selects a least object-obstructed scan line location from the object mapping data 82 for selecting and/or otherwise determining a location for optical head 22 when performing a scan of a media object 18. The method proceeds to block 124, where calibration system 40 selects the least object-obstructed scan line location for optical head 22 for performing a scan operation of a media object 18.

Thus, embodiments of the present invention automatically determine whether opaque objects are disposed within a scan window of an automatic document feeder, which may otherwise cause a streak in a scanned image of a media object, and automatically locate a scan line for an optical head of an imaging device which is least-obstructed by any identified opaque objects for scanning a media object. In some embodiments of the present invention, a calibration scan is performed of the scan window using a luminescent scan strip located in the automatic document feeder to locate and/or otherwise identify any such opaque objects within the scan window. In some embodiments of the present invention, calibration scan information is analyzed over time to determine whether changes to the severity and/or quantity of opaque objects within the scan window have occurred and, if so, notify the user of such a condition. It should also be understood that in other embodiments of the method of the present invention described in FIG. 3, certain functions may be omitted, combined, or accomplished in a sequence different than depicted in FIG. 3. Also, it should be understood that the method depicted in FIG. 3 may be altered to encompass any of the other features or aspects described elsewhere in the specification.

What is claimed is:

1. An imaging method for an imaging device, comprising:
charging a luminescent calibration strip disposed at least partially relative to a scan window of an automatic document feeder by turning on a light source of the imaging device; and
performing a calibration scan of the calibration strip to determine whether an opaque object is disposed within a visible area defined by the scan window; and
determining by a processor a percent of visible area defined by the scan window that is occluded by the opaque object; and
positioning an optical head for a scanning procedure to take advantage of identified acceptable scan line locations.

2. The method of claim 1, further comprising the processor turning off the light source during the calibration scan.

3. The method of claim 1, further comprising generating by the processor object mapping data corresponding to the scan window based on the calibration scan.

4. The method of claim 1, further comprising determining by the processor a location for an optical head of the imaging system relative to the scan window for scanning a media object based on the calibration scan.

5. The method of claim 1, further comprising automatically locating by the processor an optical head of the imaging device at a particular location relative to the scan window for scanning a media object based on the calibration scan.

6. The method of claim 1, further comprising notifying a user by the processor if an opaque object is determined to be within the visible area defined by the scan window.

7. The method of claim 1, further comprising notifying a user by the processor of a percent of the visible area defined by the scan window that is occluded.

8. The method of claim 1, further comprising performing by the processor a best-fit analysis using the calibration scan to determine a particular location for an optical head of the imaging device relative to the scan window for performing a scan of a media object.

9. The method of claim 1, further comprising performing by the processor the calibration scan corresponding to a predetermined interval.

10. The method of claim 1, wherein performing by the processor the calibration scan comprises performing a scan of the scan window to detect light emitted by the luminescent calibration strip.

11. The method of claim 1, further comprising determining by the processor a percent of the visible area defined by the scan window that is occluded by the opaque object.

12. An imaging system, comprising:
an automatic document feeder (ADF) having a luminescent calibration strip disposed at least partially relative to a scan window of the ADF; and
an imaging device adapted to perform a calibration scan of the luminescent calibration strip to determine whether an opaque object is disposed within a visible area defined by the scan window; and
a storage and processing system evaluating calibration scans of the luminescent calibration strip as a function of time to determine whether changes to quantity of opaque objects has increased.

13. The system of claim 12, wherein the imaging device is adapted to charge the luminescent calibration strip.

14. The system of claim 12, wherein the luminescent calibration strip is disposed opposite a feed strip of the ADF relative to a platen of the imaging device.

15. The system of claim 12, wherein the imaging device is adapted to automatically determine a least opaque object-obstructed location for an optical head relative to the scan window for scanning a media object based on the calibration scan.

16. The system of claim 12, wherein the imaging device is adapted to perform the calibration scan based on a predetermined interval.

17. The system of claim 12, wherein the imaging device is adapted to generate object mapping data for the scan window based on light emitted by the luminescent calibration strip.

18. An automatic document feeder (ADF), comprising:
a means for supporting at least a portion of a media object within a scan window of the ADF relative to a platen of an imaging device; and
a luminescent means adapted to emit light through the scan window toward the imaging device for determining whether an opaque object is disposed within a visible area defined by the scan window; and
means for determining least-obstructed scan line locations relative to the scan window.

19. The ADF of claim 18, wherein the luminescent means is disposed opposite a feed strip of the ADF relative to the platen of the imaging device.

20. The ADF of claim 18, wherein the luminescent means is adapted to emit light through a feed strip of the ADF for determining whether an opaque object is disposed on the feed strip.

21. The ADF of claim 18, wherein the luminescent means comprises a substrate having a luminescent material disposed thereon.

22. The ADF of claim 18, wherein the luminescent means comprises a luminescent material-impregnated substrate.

23. An imaging device, comprising:
a calibration system adapted to perform a calibration scan relative to a scan window of an automatic document feeder (ADF) to determine whether an opaque object is disposed within a visible area defined by the scan window, a light source of the imaging device off during the calibration scan, and the calibration system comprising a calibration module communicating with a controller to locate an optical head relative to the scan window having a least-obstructed view of media objects based on object mapping data and history data.

24. The imaging device of claim 23, wherein the calibration system is adapted to generate object mapping data using the calibration scan.

25. The imaging device of claim 23, wherein the calibration system is adapted to determine a least opaque object-obstructed location relative to the scan window for performing a scan of a media object based on the calibration scan.

26. The imaging device of claim 23, wherein the calibration system is adapted to automatically position an optical head of the imaging device in a least opaque object-obstructed location relative to the scan window for performing a scan of a media object based on the calibration scan.

27. The imaging device of claim 23, wherein the calibration system is adapted to perform the calibration scan based on a predetermine interval.

28. The imaging device of claim 23, wherein the calibration system is adapted to notify a user if an opaque object is determined to be within the visible area defined by the scan window.

29. The imaging device of claim 23, wherein the calibration system is adapted to perform the calibration scan using light emitted by a luminescent calibration strip of the ADF.

30. The imaging device of claim 29, wherein the calibration system is adapted to turn on the light source to charge the luminescent calibration strip of the ADF.

* * * * *